(12) United States Patent
Herold

(10) Patent No.: US 6,350,826 B1
(45) Date of Patent: *Feb. 26, 2002

(54) EPOXY VINYL ESTER AND URETHANE VINYL ESTER DERIVED FROM LOW AND HIGH MW GLYCOLS

(75) Inventor: Ulrich Herold, Bühl (DE)

(73) Assignee: The Dow Chemical Company, Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/918,111

(22) Filed: Aug. 27, 1997

(51) Int. Cl.$^7$ .......................... C08L 63/10; C08L 75/16
(52) U.S. Cl. ................. 525/528; 525/453; 525/454; 528/75; 528/76
(58) Field of Search ............... 525/454, 453, 525/528; 528/75, 76

(56) References Cited

U.S. PATENT DOCUMENTS

| | | | |
|---|---|---|---|
| 3,963,681 A | * | 6/1976 | Kaneko et al. |
| 4,163,814 A | * | 8/1979 | Asai et al. ............... 427/372 R |
| 4,379,904 A | * | 4/1983 | Ehrlich et al. ................. 528/76 |
| 4,390,662 A | | 6/1983 | Ando et al. .................... 525/28 |
| 4,618,658 A | | 10/1986 | Hefner, Jr. et al. ......... 525/454 |
| 4,824,919 A | | 4/1989 | Baker et al. ................. 525/502 |
| 5,654,390 A | * | 8/1997 | Gajewski et al. ............. 528/76 |

FOREIGN PATENT DOCUMENTS

| | | |
|---|---|---|
| EP | 0 122 611 | 10/1984 |
| EP | 0 311 288 | 4/1989 |

OTHER PUBLICATIONS

Brydson, Plastics Materials, D. Van Nostrand Company Inc, Princeton, New Jersey, p. 501, 1966.*
Saunders, Organic Polymer Chemistry, Chapman and Hill, New York, New York, p. 362, 1973.*

* cited by examiner

Primary Examiner—Robert E. L. Sellers

(57) ABSTRACT

A curable resin composition including a homogeneous mixture or blend of:
(a) an epoxy vinyl ester resin, and
(b) a urethane vinyl ester resin having a weight average molecular weight of greater than 8000 and forming a dispersed second phase in the epoxy vinyl ester resin upon curing of the curable resin composition prepared by reacting:
  (i) an alkylene bis(phenyl isocyanate) compound;
  (ii) a plurality of polyalkylene glycols having at least a bimodal distribution of molecular weights, wherein a short-chain molecular weight peak is centered at from about 1,500 to about 10,000 and a long-chain molecular weight peak is centered at from about 200 to about 800 and, optionally, a branched polyalkylene polyol with a hydroxy functionality of greater than 2 and an average molecular weight of from about 450 to about 4600; and
  (iii) a hydroxyalkyl acrylate or hydroxyalkyl methacrylate.

10 Claims, No Drawings

EPOXY VINYL ESTER AND URETHANE VINYL ESTER DERIVED FROM LOW AND HIGH MW GLYCOLS

BACKGROUND OF THE INVENTION

This invention relates to thermoset resins. More particularly, this invention relates to a curable resin composition including a mixture of epoxy vinyl ester resins and urethane vinyl ester resins.

Thermoset resins prepared from a mixture of epoxy vinyl ester resins and urethane vinyl ester resins are described in U.S. Pat. No. 4,824,919 (the '919 patent). The '919 patent describes the use of urethane oligomers as flexibilizers added to epoxy vinyl esters to impart a toughening effect, that is, increased impact resistance, to the vinyl ester resin. The '919 teaches that vinyl ester/styrene mixtures are flexibilized by adding thereto minor amounts of urethanes which (1) comprise at least one polyglycol moiety and two urethane groups and are terminated by vinyl-reactive end groups, and (2) form a dispersed second phase in the cured mixture. The flexibilized compositions otherwise largely retain the characteristic properties of the unflexibilized mixtures.

The flexibilizer described in the '919 patent "is of a nature such that the uncured mixture of resin, monomer and flexibilizer is a homogeneous liquid at ordinary temperatures." Phase separation of the flexibilizer on cure is seen as essential to obtain the desired good flexibilization effect.

The preferred flexibilizers described in the '919 patent are urethane oligomers derived from one molecular proportion of a polyalkylene glycol (for example, polyether glycols such as VORANOL* (Trademark of The Dow Chemical Company)), about two molecular proportions of an aromatic diisocyanate and about two molecular proportions of a hydroxyalkyl acrylate or methacrylate.

The thermoset resins described in the '919 patent are known to have good impact resistance when using urethane vinyl ester resins in combination with epoxy vinyl ester resins. These type of resins, which show microphase separation on cure, give better impact resistance and good thermal performance than other comparable known resins based on CTBN (carboxy-terminated-butadiene-acrylonitrile) rubber.

While the urethane oligomers disclosed in the '919 patent provide resins with good impact resistance, there still exists a need for more suitable flexibilizers which exhibit a phasing behavior (that is, phase separation upon curing) for vinyl ester resin systems and which are compatible with and stable with vinyl ester resin prior to cure. It is desired to provide resins with good impact resistance using such flexibilizers.

SUMMARY OF THE INVENTION

It has been found that the properties of oligomeric urethanes used as flexibilizers in the composition of the present invention are critically dependent on the structure of the diisocyanate component and the mixture of polyalkylene glycols used in preparing the oligomeric urethane flexibilizer. Thus, the choice of diisocyanate component and mixture of polyalkylene glycols used in the present invention is important in obtaining a final resin product with good properties.

Accordingly, one aspect of the present invention is directed to a curable thermoset resin composition which contains a homogeneous mixture of:

(a) an epoxy vinyl ester resin;

(b) a urethane vinyl ester resin having a weight average molecular weight of greater than 8,000 which forms a dispersed second phase in the epoxy vinyl ester resin upon curing of the curable formulation; and (c) optionally a co-reactive monomer, characterized in that the urethane vinyl ester resin is preparable by reacting:

(1) an alkylene bis(phenyl isocyanate) compound;

(2) at least two polyalkylene glycols having different molecular weights, including a first polyalkylene glycol with an average molecular weight of from about 1,500 to about 10,000 wherein the amount of the first polyalkylene glycol is from about 1.45 to about 12.6 weight percent based on the curable resin composition; and a second polyalkylene glycol with an average molecular weight of from about 200 to about 800 wherein the amount of the second polyalkylene glycol is from about 0.15 to about 3.75 weight percent, based on the curable resin composition; and, optionally a branched-polyalkylene polyol with a hydroxy functionality of greater than 2 and an average molecular weight of from about 450 to about 4600; and (3) a hydroxyalkyl acrylate or hydroxyalkyl methacrylate.

The invention also provides a urethane vinyl ester resin having a weight average molecular weight of greater than 8,000 which may be prepared by reacting (1) an alkylene bis(phenyl isocyanate) compound with (2) at least two polyalkylene glycols having different molecular weights, including a first polyalkylene glycol with an average molecular weight of from about 1,500 to about 10,000 and a second polyalkylene glycol with an average molecular weight of from about 200 to about 800 and, optionally, (3) a branched polyalkylene polyol with a hydroxy functionality of greater than 2 and an average molecular weight of from 450 to 4600, and (4) a hydroxyalkyl acrylate or hydroxyalkyl methacrylate.

Such vinyl ester resins may be compounded with an epoxy vinyl ester resin and, optionally, other co-reactive monomers, to produce the curable resin.

Another aspect of the present invention is directed to a process of making a curable composition comprising blending such a urethane vinyl ester resin with an epoxy vinyl ester resin.

Still another aspect of the present invention is a process of making a cured article comprising curing such a composition It has been found that the properties of oligomeric urethanes used as flexibilizers in the composition of the present invention are critically dependent on the structure of the diisocyanate component and the mixture of polyalkylene glycols used in preparing the oligomeric urethane flexibilizer. Thus, the choice of diisocyanate component and mixture of polyalkylene glycols used in the present invention is important in obtaining a final resin product with good properties.

DETAILED DESCRIPTION OF THE PREFERRED EMBODIMENTS

The present invention relates to thermoset resins comprising blends or mixtures of epoxy vinyl ester resins and urethane vinyl ester resins. The epoxy vinyl ester resins as well as the urethane vinyl ester resins used in the present invention can be dissolved in a solvent monomer such as, for example, styrene, resulting in transparent and clear solutions at room temperature and elevated temperatures. When styrene solutions of epoxy vinyl ester resins are blended with urethane vinyl ester resins at various blend ratios surprisingly, depending on the composition of the urethane vinyl ester resin and the amount of urethane vinyl ester resin blended with the epoxy vinyl ester resin, a solution is obtained which has a clear transparent to a slight hazy visual appearance and which undergoes a microphase separation on cure. Resins with a turbid or opaque visual appearance show a phase- instability and separate in a short period of time (for example, a maximum of one day) in two separate resin layers. Such resins which phase separate prior to cure do not provide the improvements of the present invention. The resin blends of the present invention that give a microphase separation on cure provide a much better impact resistance than comparable vinyl ester resins that contain, for example, a CTBN rubber as a flexibilizer. In addition, the thermal performance (glass transition temperature) of the epoxy/urethane vinyl ester blends of the present invention is only slightly decreased compared to unmodified epoxy vinyl ester resins.

Epoxy Vinyl Ester Resins

The epoxy vinyl ester resins used in the present invention may be, for example, the epoxy vinyl ester resins described in U.S. Pat. No. 4,824,919 incorporated herein by reference.

The epoxy vinyl esters suitable for the practice of the present invention are generally preparable by the adduction of an at least difunctional epoxide with at least two molecules of an unsaturated monocarboxylic acid in which the carbon-to-carbon double bond is vinyl reactive.

Exemplary of suitable epoxy resins are the well-known polyglicidyl ethers of polyphenylol alkanes and the "advanced" resins (higher polymers) formed by the reaction of polyphenols-such as bisphenol A, for example, with polyglycidyl ethers, such as the diglycidyl ether of bisphenol A, for example. Epoxy novolacs are also suitable, as are cycloaliphatic diepoxides.

The glycidyl ethers of polyphenols, such as lower alkanes (or alkenes) substituted with 3 or 4 hydroxyphenyl groups, for example, are of particular interest for the preparation of vinyl esters suitable for the practice of the present invention. Most notable among such epoxides are the triglycidyl ethers of tri(hydroxyphenyl)methanes, ethanes and propanes and the tetraglycidyl ethers of tetra(hydroxyphenyl)ethanes and propanes.

Suitable epoxides having functionalities higher than four are exemplified by the oligomeric reaction products of tri(hydroxyphenyl)methanes with epichlorohydrin, which may comprise as many as 7 glycidylether groups. Similarly, phenol/formaldehyde or bisphenol/formaldehyde novolacs containing 5 or more hydroxyphenyl groups are well-known as the corresponding polyglycidyl ethers.

Exemplary of suitable acids are the ethylenically unsaturated monoacids such as, for example, acrylic, methacrylic, crotonic and cinnamic acids. Also suitable are half-esters derived from unsaturated dicarboxylic acids and/or unsaturated alcohols-such as hydroxyalkyl acrylates, for example. Preferably, the acid is one in which the reactive vinyl group is a terminal group. Another class of suitable acids are bicycloalkenyl acids, such as, for example, 5-norbornene-2-carboxylic acid.

The epoxy vinyl ester is prepared by reacting the polyepoxide and the acid in about stoichiometric amounts, generally with heating and in the presence of a catalyst, such as a trivalent chromium salt, as for example $CrCl_3$; or a phosphine; alkali, onium salt; or a tertiary amine, for example, tris(N,N-dimethylaminomethyl phenol). Optionally, the epoxy vinyl ester resin can be formed in the presence of a non-resinous, vinyl monomer such as styrene and the resulting mixture, in this instance, will constitute what is meant by the term "epoxy vinyl ester resin."

The non-resinous, vinyl monomers ("diluents," commonly) believed suitable for the practice of the present invention include, for example, styrene, α-methylstyrene, methylstyrene, divinylbenzene and acrylonitrile and others disclosed in U.S. Pat. No. 4,824,919 incorporated herein by reference.

A substantial number of different epoxy vinyl ester resins having distinct characteristics may be prepared by reacting different epoxides (or mixtures thereof) with various unsaturated acids (or mixtures thereof). Similarly, the properties of the epoxy vinyl ester resin/non-resinous, vinyl monomer mixture may be varied by selecting various such monomers (or mixtures thereof).

Preferably, epoxy vinyl ester resin/styrene monomer compositions marketed under the trademark"DERAKANE*" by The Dow Chemical Company are used in preparing the composition of the present invention.

Urethane Vinyl Ester Resins

The urethane vinyl ester resins used in the present invention as a flexibilizer is a urethane oligomer derived from the reaction of an isocyanate group with an —OH function. A most preferred flexibilizer is a urethane oligomer derived from (i) a blend of 2 or more long- and short-chain polyalkylene glycols with a functionality equal to or greater than 2, said blend of polyalkylene glycols exhibiting a bimodal distribution of weight average molecular weight, (ii) a diphenyl alkylene diisocyanate and (iii) a hydroxyalkyl acrylate or methacrylate. The urethane oligomers of this type may be exemplified by a reaction product of (i) a blend of polypropylene glycol having a weight average molecular weight of 2,000 (for example, VORANOL* P2000 commercially available from The Dow Chemical Company), and a polypropylene glycol having a weight average molecular weight of 400 (for example, VORANOL* P400 commercially available from The Dow Chemical Company) or, alternatively, a mixture of for example VORANOL* P2000, VORANOL* P400, and a branched chain polypropylene glycol with weight average molecular weight of 755 for example VORANOL* CP755 commercially available from The Dow Chemical Company; (ii) diphenylmethane diisocyanate; and (iii) hydroxypropyl acrylate. As an illustration, the resulting urethane oligomer reaction product may have the following ideal or statistical Formula (Ia) or (Ib):

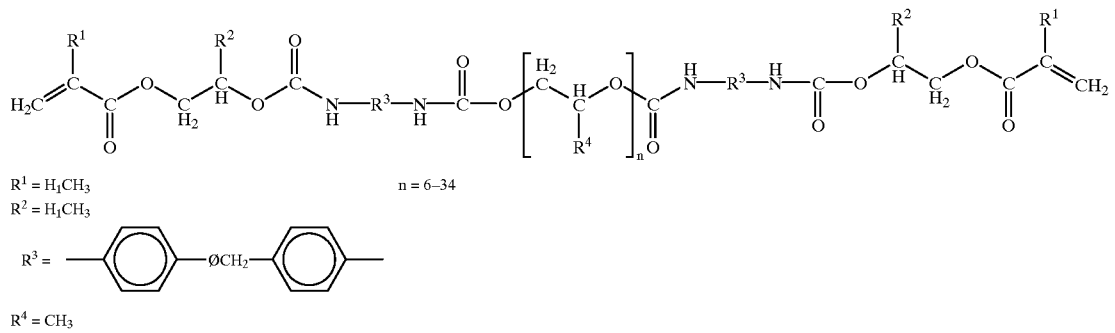

Formula (Ia)

$R^1 = H, CH_3$
$R^2 = H, CH_3$ $R^3 =$ —⟨phenyl⟩—ØCH$_2$—⟨phenyl⟩—

$R^4 = CH_3$ n = 6–34

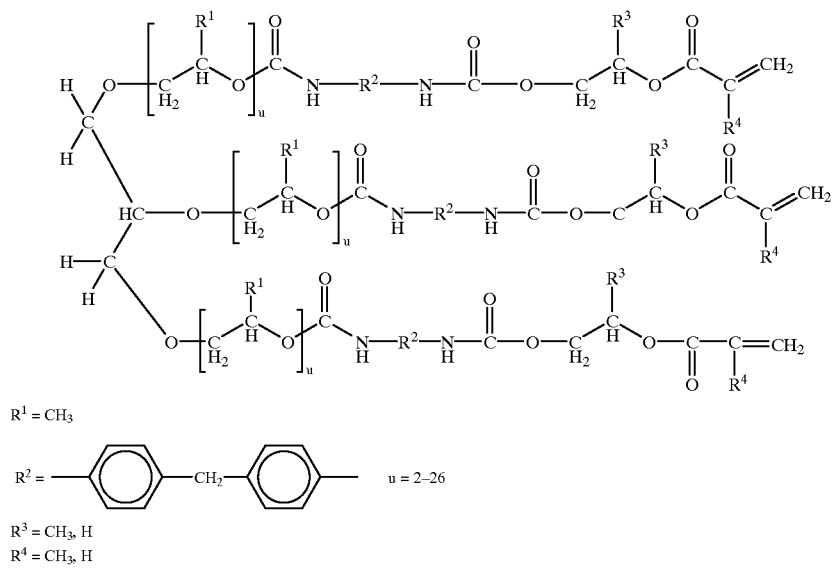

Formula (Ib)

$R^1 = CH_3$ $R^2 =$ —⟨phenyl⟩—CH$_2$—⟨phenyl⟩—   u = 2–26

$R^3 = CH_3, H$
$R^4 = CH_3, H$

The polyalkylene glycols used to make a blend thereof are those containing an alkylene linked by oxygen as shown in the following Formula (II):

$$HO\text{-}(R\text{-}O)_\overline{x}H \quad (II)$$

wherein the alkylene group R is preferably an average of at least 2 carbons, more preferably 2.5 carbons and preferably at most 10 carbons, more preferably at most 6 carbons and most preferably at most 4 carbons. The polyalkylene glycols useful in the present invention include, for example, polyethylene glycol, polypropylene glycol and copolymers thereof as well as polyols based on polyethylene or polypropylene glycols and glycerine.

The blend of polyalkylene glycols is a mixture or blend of at least two or more polyalkylene glycols having a bimodal distribution of weight average molecular weight. As known to those skilled in the art such a bimodal distribution is shown in dual peaks graphically illustrating each of the weighted average molecular weights of the polyglycols. Preferably the blend of polyalkylene glycols exhibits a weight average molecular weight peak at above about 1200 and a peak at below about 1000 weight average molecular weight. The lower peak is preferably below about 800, more preferably below about 600 and preferably above 200. The higher peak is preferably above about 1,500, more preferably above about 1,800 and preferably below 10,000 and more preferably below 5,000.

The first long-chain polyalkylene glycol useful in preparing the urethane oligomer can be, for example, a polyalkylene glycol having an average molecular weight of from about 1,500 to about 10,000.

The second short-chain polyalkylene glycol useful in preparing the urethane oligomer can be, for example, a polyalkylene glycol having an average molecular weight at from about 200 to about 800.

The third polyalkylene polyol with a functionality of greater than 2 can be a polypropylene polyol having an average functionality of 3 and an average molecular weight of from 450 to 4600.

The ratio of long-chain polyalkylene glycol to short-chain polyalkylene glycol used in the present invention is generally from about 99:1 to about 0.1:1 and preferably from about 1.66:1 to about 16:1. The ratio of 2 functional polyalkylene glycols to multifunctional polyalkylene polyols is preferably from about 10:1 to about 1.05:1.

The amount of the first polyalkylene glycol is preferably from about 1.45 to about 12.6 more preferably from about 2.9 to about 10.6 weight percent, based on the curable resin composition. The amount of the second polyalkylene glycol is preferably from about 0.15 to about 3.75 weight percent, more preferably from 0.35 about to about 3.2 based on the curable resin composition. The amount of branched-polyalkylene polyol is preferably from about 0.14 to about 1.5 weight percent, more preferably from about 0.3 to about 1.2 based on the curable resin composition. The amount of diphenylmethane diisocyanate is preferably from about 1.15 to about 7.75 weight percent, more preferably from about 2.3 to about 6.6, based on the curable resin composition. The amount of hydroxyalkyl acrylate or methacrylate is preferably from about 0.45 to about 3.2 weight percent, more preferably from about 0.9 to about 2.7, based on the curable resin composition.

The present invention uses an aromatic diisocyanate compound in preparing the urethane oligomer. The aromatic diisocyanate is preferably an alkylene bis(phenyl isocyanate) compound or an inertly-substituted variation thereof which preferably meets the following Formula (III):

NCO—Ar—R—Ar—OCN           (III)

wherein Ar is an aromatic preferably having from about 1 to about 10 carbons and more preferably Ar is phenylene; and R is an alkyl having from about 1 to about 6 carbons, more preferably about 1 to 3 carbons and most preferably methylene. The alkylene group preferably contains no more than about 6 carbon atoms, more preferably no more than about 3 carbon atoms, and most preferably no more than about 1 carbon atom. The isocyanate groups are preferably in para-position with respect to the alkylene group. The diisocyanate reactant used in preparing the urethane oligomer of the present invention is preferably methylene diphenyl diisocyanate (MDI) or an inertly-substituted variation thereof, and most preferably MDI.

The hydroxyalkyl acrylate or methacrylate used in preparing the urethane oligomer preferably contains a $C_1$–$C_6$ alkyl group, more preferably a $C_2$–$C_4$ alkyl group and most preferably an ethylene or 1,2-propylene group. Preferred examples include 2-hydroxyethyl acrylate and 2-hydroxypropyl acrylate.

The urethane vinyl ester resin is prepared by mixing the above-mentioned reactants: (i) blend of polyalkylene glycols, (ii) diisocyanate and (iii) hydroxyalkyl acrylate or methacrylate and allowing them to react. Optionally, the reaction can be carried out in the presence of one or more of the following components: a polymerizable monomer or a solvent, a polymerization inhibitor and/or a catalyst for the urethane-forming reaction.

Preferably, the reaction to form the urethane vinyl ester resin is carried out by charging the ratio of starting materials into a reactor in the following order: first adding isocyanate followed by the blend of polyalkylene glycols and then adding the hydroxyalkyl acrylate or methacrylate. The styrene monomer, if used, can be added before or after the hydroxyalkyl acrylate or methacrylate.

An optional component useful in making the urethane vinyl ester resin is a polymerizable monomer, such as the non-resinous, vinyl monomer described above. In order to decrease the viscosity of the reaction product and cause the reaction to proceed uniformly, use is made of the polymerizable monomer such as a styrene or substituted styrene or alkylated styrene. Other monomers useful in the present invention are described in U.S. Pat. No. 4,824,919.

Another optional component useful in preparing the urethane vinyl ester resin is a polymerization inhibitor. A polymerization inhibitor such as a heterocyclic component, for example phenothiazine or a phosphite such as an aryl or alkyl phosphite for example triphenyl phosphite or tributyl phosphite, may be added to the reaction system to prevent polymerization due to the acrylic or methacrylic residual groups and the polymerizable monomer.

Still another optional component useful in making the urethane vinyl ester resin is a catalyst. The catalyst used can be, for example, dibutyltin dilaurate. The urethane-forming reaction can be carried out without a catalyst, but the reaction may require a longer period of time to be completed.

The urethane-forming reaction temperature is generally from about 40° C. to t 100° C. and preferably from about 60° C. to about 80° C. The overall blending of the urethane vinyl ester resin with the epoxy vinyl ester resin is also generally carried out at a temperature of from about 40° C. to about 100° C. and preferably from about 60° C. to about 80° C.

Amounts of Epoxy and Urethane

The weight ratio of epoxy vinyl ester resin to urethane vinyl ester resin (flexibilizer) useful in the present invention is generally from about 4:1 parts by weight to about 19:1 parts by weight and preferably from about 9:1 parts by weight to about 5.65:1 parts by weight.

Other additives suitable for a particular application can be included in the composition of the present invention if desired.

In another embodiment of the present invention, resins that show a phase separation at room temperature surprisingly can be stabilized against phase separation by using small amounts of phase separation stabilizer in the composition of the present invention. By "stabilized" herein it is meant that the system does not separate into 2 or more different resin layers. The amount of stabilizer used in the composition of the present invention depends on the composition, but generally is up to about 2 percent and preferably from about 1 to about 2 percent. The stabilizer used in the present invention includes, for example, benzyl alcohol or acetyl acetone. This is important for resin systems that are applied in hot-cure (70° C. to 120° C.) applications because the resin blends that give a microphase separation at room temperature cure do not necessarily give the same effect at higher cure temperatures.

General Procedure

A process for preparing each of the following examples consists of a two-step process. In one step the urethane vinyl ester is prepared in styrene monomer and blended in the second step with a bisphenol A epoxy vinyl ester resin that is also dissolved in styrene monomer.

Part A: Preparation of the urethane vinyl ester

A calculated amount of 4,4'-diphenylmethane-diisocyanate is charged to a reactor, equipped with a stirring devise, a temperature control system, a condenser, a dropping funnel and a heating/cooling device. The reactor content is heated to about 60° C. Over about 30 minutes a mixture of calculated amounts of polypropyleneglycols (having an average molecular weight of 2000 and 400) and an appropriate catalyst (preferably dibutyltin dilaureate. 1500 ppm based on the amount of polypropyleneglycols) is added to the reactor under agitation. The temperature inside the reactor is kept at about 60° C. to 65° C. After the addition of the polypropyleneglycol mixture, the reaction mixture is agitated at the given temperature for 3 to 4 hours. After that time, a sample is taken and analyzed for the residual amount of isocyanate. When the calculated level of isocyanate has been reached the calculated amount of styrene monomer as well as an appropriate inhibitor (for example, phenothiazine) is added to the reaction mixture. Then hydroxy-ethyl- or -propylacrylate is carefully added to the reaction mixture in such a manner that the temperature of the reaction mixture does not rise above 80° C. After the addition of the hydroxy-alkyl acrylate to the reaction mixture, the mixture is kept under agitation at 65° C. to 70° C. for another 3 to 4 hours. After that time the reactor contents is cooled to 40° C. The resulting urethane vinyl ester is a colorless to straw-yellow low viscous liquid.

Part B: Preparation of a Bisphenol A based Epoxy vinyl-ester resin and blend with urethane vinyl ester The preparation of the bisphenol A based vinyl ester resin is described in U.S. Pat. No. 4,824,919 incorporated herein by reference.

The urethane vinyl ester is preferably added to the bisphenol A based vinyl ester at 80° C. together with the residual amount of styrene, additives and inhibitors. After a maximum mixing time of 60 minutes, the blend is finished and is cooled to room temperature (25° C.).

Depending on the composition, the resulting epoxy-urethane-vinyl-ester blend is a colorless to slightly straw-yellow, low viscous liquid of transparent to slight hazy appearance.

In all cases, Parts A and B were mixed in a ratio of 1:3 to form the final resin composition.

EXAMPLE 1

|  | wt % |
|---|---|
| Part A |  |
| 4,4'-Diphenylmethane-diisocyanate (IEW = 162) | 17.23 |
| Polypropyleneglycol (AvMw = 2000) (VORANOL* P2000) | 28.6 |
| Polypropyleneglycol (AvMw = 400) (VORANOL* P400) | 6.32 |
| Hydroxypropylacrylate | 7.84 |
| Styrene | 40.0 |
| Part B |  |
| Bisphenol A Epoxy Resin (EEW = 186) | 37.12 |
| Bisphenol A (HEW = 114) | 8.39 |
| Methacrylic Acid | 11.16 |
| Styrene | 43.33 |

EXAMPLE 2

|  | wt % |
|---|---|
| Part A |  |
| 4,4'-Diphenylmethane-diisocyanate (IEW = 143) | 14.96 |
| Polypropyleneglycol (AvMw = 2000) (VORANOL* P2000) | 35.76 |
| Polypropyleneglycol (AvMw = 400) (VORANOL* P400) | 3.24 |
| Hydroxyethylacrylate | 6.04 |
| Styrene | 40.0 |
| Part B |  |
| Bisphenol A Epoxy Resin (EEW = 186) | 37.12 |
| Bisphenol A (HEW = 114) | 8.39 |
| Methacrylic Acid | 11.16 |
| Styrene | 43.33 |

Preparation of Cured Resin Samples

Example 1 was cured at room temperature (cure formulation: resin 100 g, TRIGONOX™ K 80 (Trademark of AKZO Chemicals Inc.) 1.5 g (cumene hydroperoxide), cobalt II naphthenate (6 percent Co) 0.5 g) for 24 hours and post-cured at 150° C. for 2 hours. Afterwards the cured sample cooled to room temperature within 24 hours.

Example 2 was cured at 100° C. (cure formulation: resin 100 g, benzyl peroxide (BPO-50) 1.0 g, PERKADOX™ 16S (Trademark of AKZO Chemicals Inc.) di-(4-tertiary-butylcyclohexylperoxydicarbonate) 1.0 g). The cure time was 10 minutes.

The properties of the resultant cured resins are shown in the following Table I:

TABLE I

|  | RESIN OF EXAMPLE 1 | COMPARATIVE EXAMPLE A # | RESIN OF EXAMPLE 2 | COMPARATIVE EXAMPLE B # |
|---|---|---|---|---|
| Viscosity (mPas) | 374 | 350 | 410 | 350 |
| Cure Schedule | 24 hrs RT/2 hrs 150° C. | 24 hrs RT/2 hrs 150° C. | 100° C./12 min. | 100° C./12 min. |
| Tg (° C.) | 105 | 123 | 92 | 114 |
| PLAIN STRAIN COMPRESSION |  |  |  |  |
| Stress at Yield (MPa) | 109 | 128.2 | 61.9 | 100.9 |
| Strain at Yield (%) | 5.36 | 5.76 | 5.23 | 6.53 |
| Modulus (MPa) | 3509 | 3025 | 1503 | 1773 |

TABLE I-continued

|  | RESIN OF EXAMPLE 1 | COMPARATIVE EXAMPLE A # | RESIN OF EXAMPLE 2 | COMPARATIVE EXAMPLE B # |
|---|---|---|---|---|
| TENSILE TEST |  |  |  |  |
| Stress at Yield | 64.65 | 75.89 | 37.8 | 55.8 |
| Strain at Yield | 4.11 | 3.95 | 3.45 | 3.61 |
| Strain at Break | 13.57 | 7.30 | 37.19 | 11.54 |
| Modulus | 2440 | 2878 | 1762 | 2393 |
| FLEXURAL TEST |  |  |  |  |
| Stress at Yield (MPa) | 110.4 | 131.9 | 57.4 | 98.31 |
| Strain at Yield (%) | 5.73 | 5.83 | 6.04 | 5.91 |
| Stain at Break (%) | 10.06 | 8.29 | 10.33 | 9.95 |
| Modulus (MPa) | 2917 | 3283 | 1669 | 2644 |
| Impact IZOD (J/m) | 779 | 476 | 890 | 606 |
| Impact to IZOD unnotched (J/m) | 60491 | 36890 | 69306 | 46994 |
| Visual Appearance | turbid | clear | turbid | clear |

Commercial bisphenol A based epoxy vinyl ester resin modified with CTBN rubber.

EXAMPLE 3

|  | wt % |
|---|---|
| Part A |  |
| MDI | 28.43 |
| VORANOL* P2000 | 49.7 |
| VORANOL* P400 | 5.96 |
| Glycerine-based-branched-polypropylene polyol Mw 450 (VORANOL* CP450) | 2.98 |
| Hydroxypropylacrylate | 12.92 |
| Part B |  |
| Bisphenol A Epoxy Resin (EEW = 186) | 37.12 |
| Bisphenol A (HEW = 114) | 8.39 |
| Methacrylic Acid | 11.16 |
| Styrene | 43.33 |

Parts A and B were mixed and the resultant mixture was cured. The impact resistance for the cured product was 661 J/m.

EXAMPLE 4

|  | wt % |
|---|---|
| Part A |  |
| MDI | 26.82 |
| VORANOL* P2000 | 51.57 |
| VORANOL* P400 | 4.69 |
| Glycerine-based branched-polypropylene polyol Mw 755 (VORANOL* CP755) | 4.72 |
| Hydroxypropylacrylate | 12.19 |
| Part B |  |
| Bisphenol A Epoxy Resin (EEW = 186) | 37.12 |
| Bisphenol A (HEW = 114) | 8.39 |
| Methacrylic Acid | 11.16 |
| Styrene | 43.33 |

Parts A and B were mixed and the resultant mixture was cured. The impact resistance for the cured product was 662 J/m.

What is claimed is:

1. A curable thermoset resin composition which contains a homogeneous mixture of:
   (a) an epoxy vinyl ester resin;
   (b) a urethane vinyl ester resin having a weight average molecular weight of greater than 8,000 which forms a dispersed second phase in the epoxy vinyl ester resin upon curing of the curable formulation; and
   (c) optionally a co-reactive monomer, characterized in that the urethane vinyl ester resin is preparable by reacting:
   (1) an alkylene bis(phenyl isocyanate) compound;
   (2) at least two polyalkylene glycols having different molecular weights, including a first polyalkylene glycol with an average molecular weight of from about 1,500 to about 10,000 wherein the amount of the first polyalkylene glycol is from about 1.45 to about 12.6 weight percent based on the curable resin composition; and a second polyalkylene glycol with an average molecular weight of from about 200 to about 800 wherein the amount of the second polyalkylene glycol is from about 0.15 to about 3.75 weight percent, based on the curable resin composition; and, optionally a branched-polyalkylene polyol with a hydroxy functionality of greater than 2 and an average molecular weight of from about 450 to about 4600; and
   (3) a hydroxyalkylacrylate or hydroxyalkyl methacrylate.

2. The composition of claim 1 wherein the coreactive monomer is styrene.

3. The composition of claim 1 wherein the mixture contains from about 95 to about 80 weight percent of said epoxy vinyl ester resin.

4. The composition of claim 1 wherein the mixture contains from about 5 to about 20 weight percent urethane vinyl ester resin.

5. The composition of claim 1 wherein the amount of the branched polyalkylene polyol is from about 0.14 to about 1.5 weight percent based on the curable resin composition.

6. The composition of claim 1 wherein the alkylene bis(phenyl isocyanate) compound is diphenylmethane diisocyanate employed in an amount of from about 1.15 to about 7.75 weight percent based on the curable resin composition.

7. The composition of claim 1 wherein the amount of the hydroxyalkyl acrylate or methacrylate is from about 0.45 to about 3.2 weight percent based on the curable resin composition.

8. The composition of claim 1 wherein the urethane vinyl ester resin has a weight average molecular weight of from greater than about 8,000 to about 12,000.

9. A process for making a curable composition comprising blending an epoxy vinyl ester resin with a urethane vinyl ester resin to produce a homogeneous mixture, wherein the urethane vinyl ester resin is such as to form a dispersed second phase in the epoxy vinyl ester resin upon curing of the curable formulation; and wherein the urethane vinyl ester resin has a weight average molecular weight of greater than 8,000 and is preparable by reacting:

(1) an alkylene bis(phenyl isocyanate) compound;

(2) at least two polyalkylene glycols having different molecular weights, including a first polyalkylene glycol with an average molecular weight of from about 1,500 to about 10,000 wherein the amount of the first polyalkylene glycol is from about 1.45 to about 12.6 weight percent based on the curable resin composition; and a second polyalkylene glycol with an average molecular weight of from about 200 to about 800 wherein the amount of the second polyalkylene glycol is from about 0.15 to about 3.75 weight percent, based on the curable resin composition; and, optionally a branched-polyalkylene polyol with a hydroxy functionality of greater than 2 and an average molecular weight of from about 450 to about 4600; and (3) a hydroxyalkylacrylate or hydroxyalkyl methacrylate.

10. A process for making a cured article comprising curing a composition as claimed in claim 1.

* * * * *